United States Patent

[11] 3,547,042

| [72] | Inventor | William M. O'Connor |
| | | Westport, Conn. |
| [21] | Appl. No. | 820,721 |
| [22] | Filed | May 1, 1969 |
| [45] | Patented | Dec. 15, 1970 |
| [73] | Assignee | Avco Corporation |
| | | Stratford, Conn. |
| | | a corporation of Delaware |

[54] VEHICLE PROPULSION UNIT
11 Claims, 7 Drawing Figs.

[52] U.S. Cl. .................................................. 104/155,
39/25, 105/63
[51] Int. Cl. ...................................................... B61b 13/12,
B61c 5/04
[50] Field of Search ........................................... 104/154,
155, 134; 105/61.5, 63, 64, 65; 188/155; 244/63

[56] References Cited
UNITED STATES PATENTS
2,717,744 9/1955 Birnbaum ..................... 244/63

| 2,737,357 | 3/1956 | Ringleb ........................ | 244/63 |
| 2,869,479 | 1/1959 | Hutchinson .................. | 104/155 |

Primary Examiner—Arthur L. La Point
Assistant Examiner—Robert W. Saifer
Attorney—Charles M. Hogan and Gary M. Gron ABSTRACT: The disclosure illustrates a propulsion unit for a vehicle movable along a fixed reaction rail having a plurality of linearly positioned, vertical curved vanes. A gas turbine engine, mounted in the vehicle, discharges a propulsive fluid stream through a flexible conduit to a power head guided along the reaction rail. The inlet of the power head has a series of vertical pivotal blades for selectively directing flow in an aft direction across one side of the reaction rail to produce a forward thrust, directing flow in a forward direction to produce an aft thrust, and blocking flow. A series of blades and ducts are positioned on an opposite side of the reaction rail to receive forwardly directed fluid from the curved vanes and change its direction for producing an additional forward thrust.

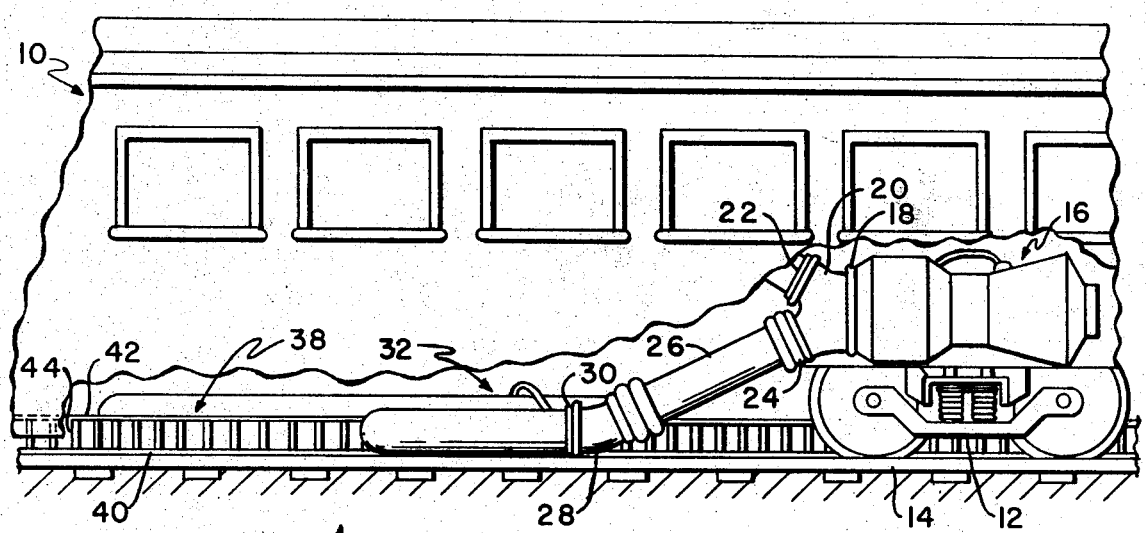
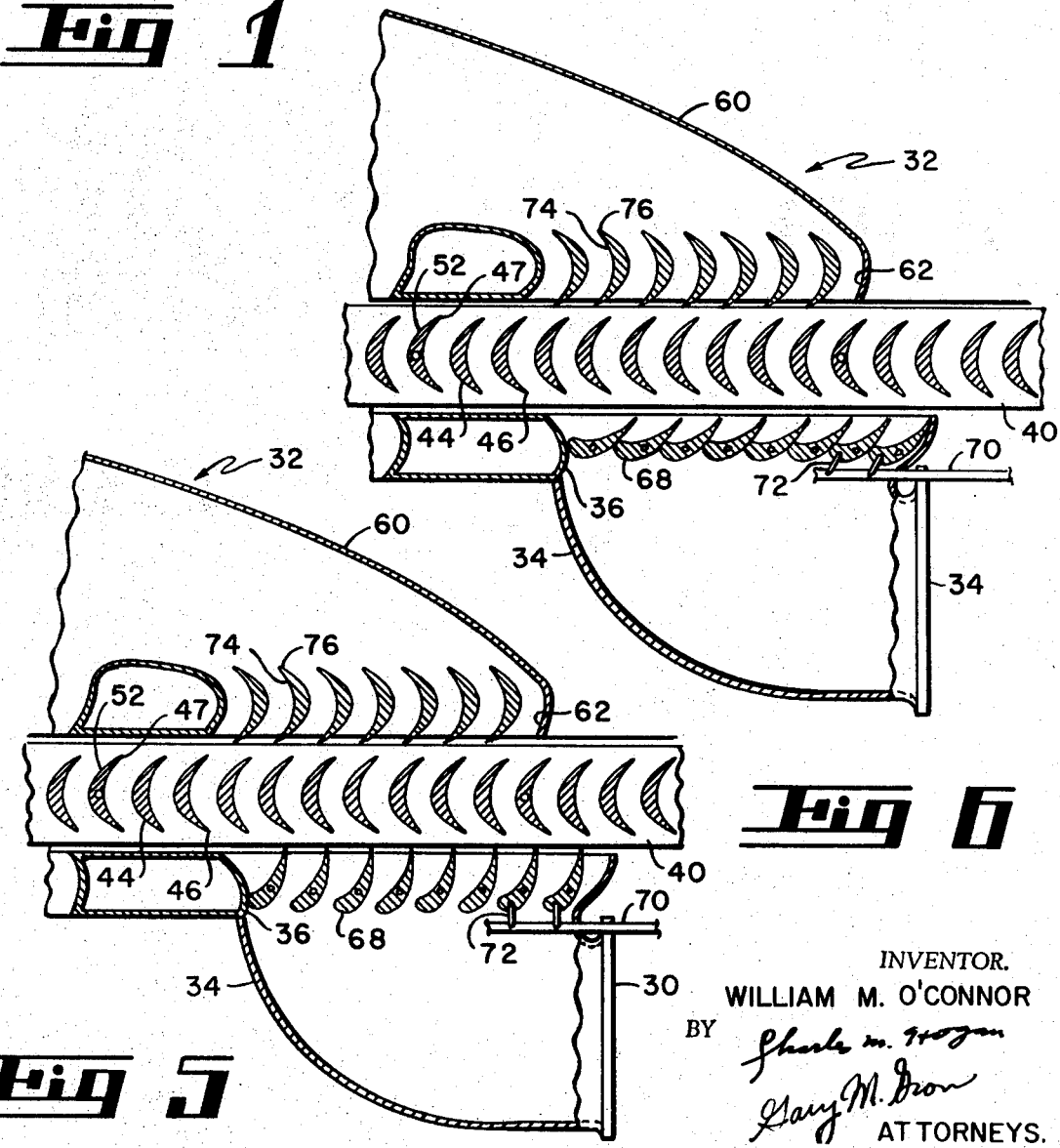

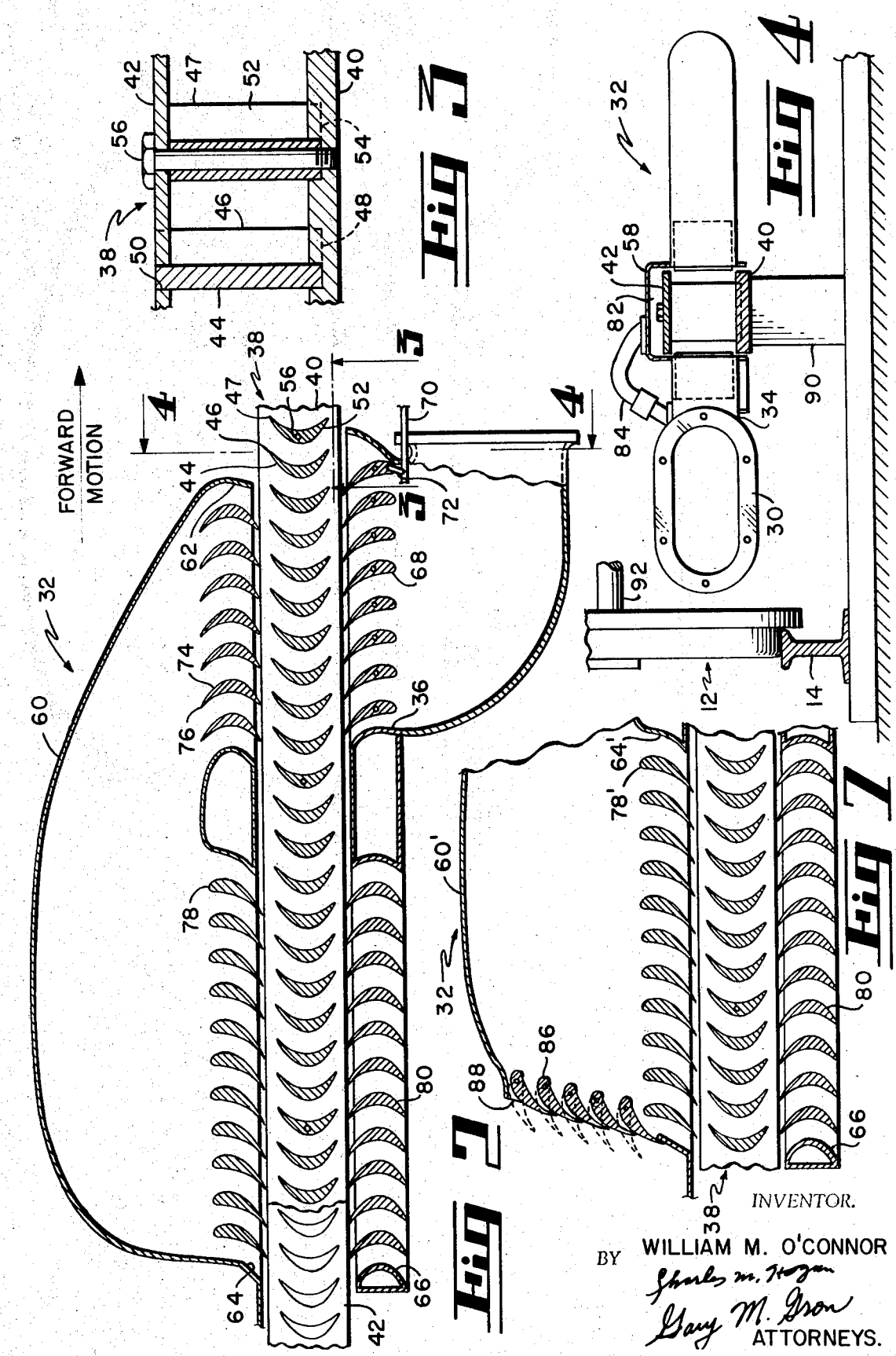

3,547,042

VEHICLE PROPULSION UNIT

BACKGROUND OF THE INVENTION

There have been many types of propulsion units proposed for use with high speed rail vehicles. A typical arrangement for driving a high speed rail vehicle utilizes a suitable motor that directly drives the wheels of the vehicle. While this gives acceptable performance for low and moderately high speeds, it is impractical for very high speeds. The reason for this is that it requires extremely smooth and precision tracks for adequate power transfer from the wheels to the track, thereby necessitating an extensive and continuous track maintenance.

Reaction propulsion units have been proposed for vehicles traveling at speeds of over 200 miles an hour. However, these units create a high degree of noise and are relatively inefficient for speeds in this range.

Therefore, it is an object of the present invention to provide a propulsion unit for a vehicle which has a low level of noise and a high degree of efficiency.

SUMMARY OF THE INVENTION

The above ends are achieved by a propulsion unit for a vehicle movable along a fixed reaction rail. The reaction rail has a plurality of vertical, linearly positioned, curved vanes with their side edges facing the direction of forward motion of the vehicle. The propulsion unit comprises a means for discharging a propulsive fluid stream, flow control means connected to the vehicle for receiving the fluid stream, and a flow direction means connected to the flow control means and positioned on the opposite side of the reaction rail for receiving fluid and changing its direction. The flow control means is adapted to selectively block flow of the stream or direct the stream in a forward direction to produce a reverse thrust. The flow control means additionally can direct the fluid stream in an aft direction to produce a forward thrust and to direct the fluid stream against one side of the reaction rail so that the fluid stream is turned to a forward direction by the curved reaction vanes. The direction-changing means positioned on the opposite side of the rail receives the fluid stream and changes its direction to produce an additional forward thrust.

DESCRIPTION OF THE INVENTION

The above and other related objects and features of the present invention will be apparent from a reading of the following description of the disclosure found in the accompanying drawings and the novelty thereof pointed out in the appended claims.

In the drawings:

FIG. 1 is an elevational side view of a railway vehicle driven by a propulsion unit embodying the present invention;

FIG. 2 is a plan view of a power head for the propulsion unit illustrated in FIG. 1;

FIG. 3 is an enlarged fragmentary side view of a reaction rail used with the power head of FIG. 2 and taken on lines 3—3 of FIG. 2;

FIG. 4 is a view taken on lines 4—4 of FIG. 2;

FIGS. 5 and 6 are fragmentary views of the power head shown in FIG. 2 in different operating conditions;

FIG. 7 is a fragmentary plan view of the power head shown in FIG. 2 illustrating a different embodiment of the present invention.

FIG. 1 illustrates a vehicle 10 supported by suitable trucks 12 (only one of which is shown) so that it is movable along a pair of rails 14. The vehicle 10 is driven by a propulsion unit comprising a device 16 for discharging a propulsive fluid stream. As herein illustrated, the device 16 is a gas turbine engine which receives air, compresses it, injects a metered amount of fuel and ignites the mixture to produce a high energy propulsive stream. However, it is to be understood that other devices may be used for generating a propulsive fluid stream. One example of this would be a steam-generating device.

The gas turbine engine discharges the propulsive fluid stream through a discharge end 18. A suitable selector valve 20 is positioned over the discharge end 18 and has two outlets 22, 24. As later described, the valve 20 is adapted to control the relative flow through the respective outlets 22, 24. The outlet 22 connects with a suitable reservoir or overboard discharge outlet. The outlet 24 connects with a conduit 26 capable of flexing in a radial direction but able to transmit force along its axis. The conduit extends from the selector valve 20 to a transition duct 28 secured on an inlet flange 30 of a power head, generally indicated by reference character 32.

As shown in FIGS. 1 and 2, the power head 32 is guided over a fixed reaction rail 38 comprising lower and upper parallel strips 40, 42. A series of vertical curved vanes 44, 52 are positioned between the parallel strips 42, 40. The curved vanes are arranged in a linear fashion and have their side edges 46, 47 facing in the direction of forward motion of the vehicle 10. As shown in FIG. 3, each vane 44 is received in a recess 48 formed in bottom strip 40 and conforming to the cross section of the vane 44. An opening 50, also conforming to the cross section of the vane 44, is formed in the upper strip 42. To support the strips 42, 40 in a given parallel position, the vane 52 is provided at suitable intervals. The support vane 52 has the same shape as the vane 44 and is received in a recess 54 in the bottom strip 40. The top side of vane 52 abuts the underside of the upper strip 42. A suitable bolt 56 extends through the strip 42 and vane 52 and is received in threads in lower strip 40 for holding the components together. For easy removal, the vane 44 may be retained loosely in the recess 48 and opening 50.

FIG. 2 shows the power head 32 in substantial detail. As shown in that view, the inlet flange 30 is formed on an inlet duct 34 having an elongated outlet end 36 along one side of reaction rail 38. The inlet duct 34 is secured to a central U-shaped support member 58 positioned along the upper strip 42 of the rail 38 (see FIG. 4). A second duct 60 is secured to the support member 58 on the opposite side of reaction rail 38. The duct 60 has an elongated inlet end 62 approximately in line with the discharge end 36 of duct 34. Duct 60 has an increasing flow area to an elongated outlet end 64 having a larger area than inlet 62. A third duct 66 is formed on the first side of the reaction rail 38 and secured to the U-shaped support member 58.

A plurality of vertical reaction blades 68 are pivotally mounted in the outlet end 36 of duct 34. The blades 68 are actuated by a suitable input linkage 70, connected to bell cranks 72 suitably secured to the blades 68. The blades 68 can be pivoted from the position shown in FIG. 2 or to a forward position shown in FIG. 5, or pivoted to block flow through the power head 32 as shown in FIG. 6. A second stage of curved blades 74 are positioned in the inlet end 62 of duct 60. The blades 74 are impulse type and have their side edges 76 facing in an aft direction relative to the vehicle 10. A third stage of blades 78 is positioned in the outlet end 64 of duct 60. The blades 78 are reaction type and shaped to direct the flow from the duct 60 in an aft direction. A fourth stage of blades 80 is positioned in the duct 66. The blades 80 are impulse type blades having their side edges facing in an aft direction.

While the power head 32 may be guided on rollers or other suitable means over the reaction rail 38, it is preferable to support the power head on a cushion of air. This cushion is provided by forming a chamber 82 through the cooperation of the upper strip 42 and the upper end of the U-shaped support member 58, as seen in FIG. 4. The chamber 82 is pressurized from the propulsive gas stream entering inlet duct 34 via a suitable conduit 84. It is to be understood that suitable means can be provided to maintain a pressure level in chamber 82 to maintain the power head at a correct level relative to the reaction rail 38.

When the propulsion unit is used with a track-guided vehicle, the reaction rail 38 is mounted on posts 90 to position the upper end of the fixed rail 38 beneath the axles 92 for the trucks 12 (see FIG. 4). The rail 38 also is elevated enough so that the power head 32 will not touch the rails 14, e.g. when passing across a switch. If another type of guiding arrangement is used for the vehicle 10, this positioning would not be required.

In operation the gas turbine engine 16 is started with the blades 68 pivoted to the closed position shown in FIG. 6 and the valve 20 adjusted so that it diverts a major portion of the hot gas stream through outlet 22. When the engine has been started and is maintained in an idle condition, sufficient pressure is provided through flexible duct 26 to the power head 32 to pressurize chamber 82 and maintain the power head 32 on an air cushion above the reaction rail 38.

When it is desired to propel the vehicle 10 in a forward direction the valve 20 is adjusted so that all the gas stream passes through conduit 26 and the blades 68 are pivoted to the position shown in FIG. 2 wherein the gases are discharged in an aft direction. The gas turbine engine 16 is advanced to an operating condition, thereby greatly increasing the discharge of exhaust gases through outlet 36. The discharge of gases from blades 68 in an aft direction produces a resultant reaction force in a forward direction. After the flow has been discharged from the blades 68, it passes across the vanes 44 and 52 where its direction is changed from the reverse to the forward direction relative to the vehicle's motion. The forwardly directed gas impinges on the impulse blades 74 positioned in the inlet 62 of duct 60. The blades 74 turn the flow to a reverse direction thereby producing an additional impulse forward thrust. The fluid then passes to the outlet of chamber 60 where it is discharged by the blades 78 in an aft direction to produce an additional reaction forward thrust. The fluid thus discharged passes in the opposite direction across the vanes 44 and is turned from the aft direction to the forward direction relative to the vehicle. The fluid then impinges upon impulse blades 80 where its direction is changed to produce an additional impulse thrust. The fluid is finally discharged from the power unit thereby producing an additional reaction thrust in a forward direction. Each time the fluid passes through the reaction or impulse stages of blades its velocity is reduced as it produces a forward thrust. In this fashion a maximum of energy is extracted from the gas and the relatively high velocity of the gases discharged from the gas turbine engine 16 is reduced to a relatively low velocity. In fact, the discharge velocity, relative to the power head 32, tends to approach the absolute forward velocity of the railway vehicle 10. It is well known to those skilled in the art that the most efficient means of propulsion is where a propulsive fluid is discharged from a moving body with a relative discharge velocity equal to the absolute forward velocity of the vehicle.

The above propulsion unit can be modified to vary the number of blade stages across which the fluid passes to tailor the exit velocity to the speeds of the vehicle. A typical example of a manner in which this can be accomplished is shown in FIG. 7. In this embodiment the aft end of chamber 60 is provided with a series of pivotal blades 86 normally maintained in a position where they close off an opening 88 in the end of duct 60'. For lower vehicle speeds the blades 86 are maintained in a closed position, but for higher speeds they are pivoted to an open position where a substantial portion of the fluid through duct 60' is discharged from outlet 88 thereby producing a high velocity force. It is to be noted that in this condition blades 78' would also discharge a portion of the flow. If the discharge through these blades would detract from the propulsive efficiency of the unit in this condition, the blades 78' could be made pivotal to close off the discharge opening 64'.

When the vehicle is to be stopped, the gas flow from the engine 16 may be turned to idle for a slow stop or the blades 68 may be pivoted to the position shown in FIG. 5 wherein the gas flow is directed in a forward direction. This produces a reverse reaction thrust that greatly enhances the braking capabilities of the propulsion unit. The position of the blades 68 in FIG. 5 may also be used for a limited amount of reverse motion.

It is noted that the power head 32 is guided along the reaction rail 38 while the engine 16 is fixed in the railway vehicle 10. The flexible duct 26 enables the vehicle 10 and the power head limited displacement relative to one another to accommodate the bumps and irregularities of the track at these velocities. The duct 26, however, is capable at the same time of transmitting an axial thrust so that the vehicle 10 can be adequately propelled.

The above propulsion unit is highly desirable for use in propulsion vehicles of all types. It is not limited solely to railed vehicles but may be used with equal efficiency on other types, such as air cushion or ground effects vehicles. In some instances it may be desirable to have the reaction rail 38 provide the prime support for vehicle. In any of these installations the propulsion unit disclosed offers the advantage of providing the most efficient type of propulsion for the speeds normally encountered in a mass transportation system. Furthermore, the unit is conveniently positioned underneath the vehicle. Therefore, the sound of the high velocity gas stream can be effectively dissipated thereby greatly reducing exterior noise and making the unit especially suitable for heavily populated areas.

Since the flow across the reaction rail is shut off while the engine is idling and the vehicle stopped, the blades of the reaction rail do not experience a substantial increase of temperature. This is so because when the gas flow from the propulsion unit is substantial and its temperature is high, the vehicle is moving at such a rate that it quickly passes by the individual blades. This feature enables the use of reaction blades from relatively low cost, low temperature materials, thereby enhancing the economics of the propulsion unit. Furthermore, since the blades 44 are loosely held in position in the parallel strips, they can be quickly and conveniently removed for replacement.

I claim:

1. A propulsion unit for a vehicle movable along a fixed reaction rail having a plurality of vertical, linearly positioned, curved vanes with their side edges facing the direction of forward motion of said vehicle, said propulsion unit comprising:
   means for discharging a propulsive fluid stream;
   flow control means connected to said vehicle and receiving said fluid stream for selectively blocking flow of said stream and directing said fluid stream in a forward direction relative to said vehicle, thereby producing a reverse thrust, and directing said fluid stream in an aft direction relative to said vehicle, thereby producing a forward thrust and directing said fluid stream against one side of said reaction rail so that said fluid stream is turned to a forward direction by said curved vanes; and
   means connected to said flow control means and positioned adjacent the opposite side of said reaction rail for receiving the forwardly directed stream from said curved vanes and changing the direction of flow of said gas stream, thereby producing an additional forward thrust.

2. A propulsion unit as in claim 1 wherein said flow control means comprises:
   a first duct having an elongated discharge opening positioned along a first side of said reaction rail;
   a first stage of vertical blades positioned along the discharge opening of said duct, said vanes being pivotal between three positions for respectively blocking flow, discharging said fluid stream in a forward direction, and discharging said fluid stream in an aft direction.

3. Apparatus as in claim 2 wherein:
   said fluid discharge means comprises a gas turbine engine and duct means for connecting the discharge from said gas turbine engine to said flow control duct; and
   said propulsion unit further comprises means for discharging said propulsive fluid stream away from said reaction rail when said first stage blades are pivoted to the position for blocking flow.

4. A propulsion unit as in claim 2 wherein said direction-changing means includes:
   a second duct having an elongated inlet opening positioned along a second side of said reaction rail; and a second stage of vertical blades positioned in said second duct to receive said forwardly directed fluid stream from the curved vanes and change its direction for producing forward thrust.

5. A propulsion unit as in claim 4 wherein said second duct extends from said second stage blades to an elongated discharge opening positioned along side the second side of said reaction rail, and wherein said direction-changing means further comprises:
  a third stage of blades positioned in the discharge outlet of said second duct for directing the flow from said chamber in an aft direction against said fixed curved vanes so that the flow is again turned to a forward direction;
  a third duct having an elongated opening alongside said reaction rail approximately in line with said third stage blades; and
  a fourth stage of blades positioned in said third duct for receiving the flow from said fixed curved vanes and turning the flow to a rearward direction.

6. A propulsion unit as in claim 5 further comprising means for controlling the number of stages of blades across which said fluid stream passes for maintaining the discharge from said propulsion unit at a relative discharge velocity approximately equal to the forward absolute velocity of the propulsion unit.

7. A propulsion unit as in claim 1 wherein said flow control means is guided along said reaction rail and wherein: said means for discharging a propulsive fluid comprises a fluid generator fixed to said vehicle and a flexible duct extending from said fluid generator to said flow control means and capable of transmitting a thrust along its axis.

8. A propulsion unit as in claim 1 further comprising means for supporting said flow control means and said flow direction-changing means on a cushion of air maintained on the upper side of said reaction rail and supplied from said fluid stream discharge means.

9. A propulsion unit as in claim 8 wherein said air cushion supporting means comprises:
  means connected to said flow control means and said flow direction-changing means for forming a chamber in combination with the upper side of said reaction rail; and
  conduit means extending from said fluid stream discharge means to said chamber means for maintaining a fluid pressure therein sufficiently high to support said flow control means and said flow direction-changing means.

10. A propulsion system comprising:
  a fixed reaction rail including a plurality of upright curved vanes having their sides facing a forward direction along said reaction rail;
  means for discharging a propulsive fluid stream;
  flow control means receiving said fluid stream for selectively blocking flow of said stream, and directing said fluid stream in said forward direction thereby producing a reverse thrust, and directing said fluid stream in a reverse direction thereby producing a forward thrust and directing said fluid stream against one side of said reaction rail so that said fluid stream is turned to a forward direction by said curved vanes; and
  means connected to said flow control means and positioned adjacent the opposite side of said reaction rail and receiving the forwardly directed stream from said curved vanes for changing the direction of flow of said gas stream thereby producing an additional forward thrust.

11. A propulsion system as in claim 10 wherein said fixed reaction rail comprises: a fixed lower strip and an upper parallel strip mounted at a given distance from said lower strip, said strips having a plurality of holes therein conforming to the cross section of said plurality of upright curved vanes, said vanes being loosely positioned in said rail.